No. 834,618. PATENTED OCT. 30, 1906.
A. T. HERRICK.
PIPE COUPLING.
APPLICATION FILED SEPT. 22, 1905.

Witnesses
Jos. F. Collins.
H. F. Simms

Inventor
Austin T. Herrick
by Knight Bros
Attorneys

UNITED STATES PATENT OFFICE.

AUSTIN T. HERRICK, OF BRADFORD, PENNSYLVANIA.

PIPE-COUPLING.

No. 834,618.　　　Specification of Letters Patent.　　　Patented Oct. 30, 1906.

Application filed September 22, 1905. Serial No. 279,738.

*To all whom it may concern:*

Be it known that I, AUSTIN T. HERRICK, a citizen of the United States, residing at Bradford, county of McKean, State of Pennsylvania, have invented certain new and useful Improvements in Pipe-Couplings, of which the following is a specification.

This invention relates to pipe-couplings.

In devices of this kind the desideratum is to so shape the collar and the sleeve that the packing will be forced with maximum pressure against the pipe and that during the application of the pressure the packing will not be dislodged or distorted, thereby destroying its effectiveness. The coupling should also be simple and cheap to manufacture.

An object of the present invention is to meet the above requirements.

Other objects will be set forth in the following description and will be more particularly pointed out in the appended claims.

Figure 1:
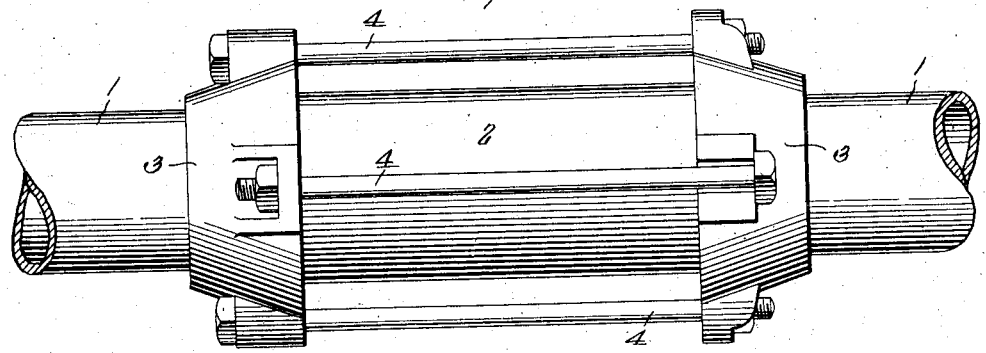
Figure 2:
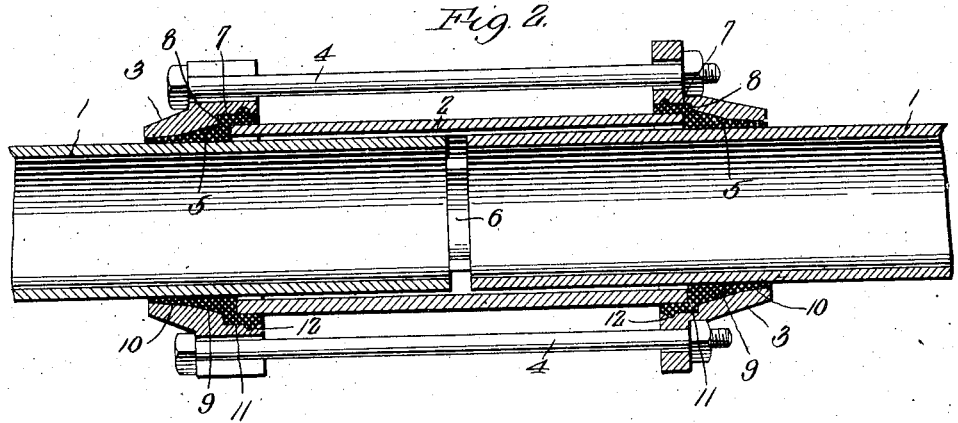
Figure 3:
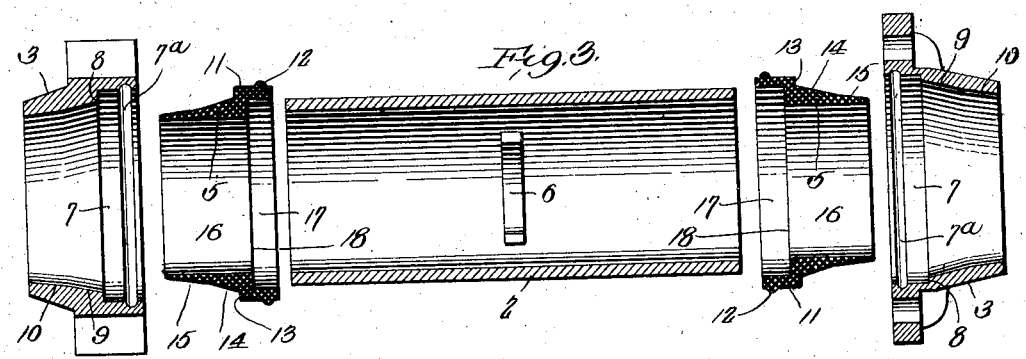

In the drawings, Figure 1 is a plan view of my invention applied. Fig. 2 is a longitudinal section of the invention applied, and Fig. 3 is a longitudinal section detached.

Referring more particularly to the drawings, 1 indicates the ends of two pipes; 2, the sleeve; 3, the collars; 4, the tie or draw rods, and 5 the elastic packing. The sleeve is formed from ordinary piping and has brazed on the inside near the center one or more segmental lugs 6. The collars are alike and are each provided with an enlarged cylindrical bore 7 at one end, the wall of which near the middle is provided with an annular channel 7ª. Having its largest diameter disposed toward and less than the diameter of the cylindrical bore to provide a shoulder 8 is a tapering bore 9. This bore 9 merges at its smaller end into the largest diameter of a second tapering bore 10. The packing-rings 5 are formed to fit the inner walls of the collar, and for this purpose each has an enlarged cylindrical portion 11 provided with an annular projection 12. At the inner end of the cylindrical portion is formed a shoulder 13, and from this the periphery is provided with a tapered portion 14, which merges at its smallest diameter into the largest diameter of a second tapered portion 15, the latter taper not being so great as the former. The ring is also provided with a bore 16 to fit a pipe and an enlarged bore 17 to receive an end of the sleeve 2 and to surround a portion of the same, the end of the sleeve abutting a shoulder 18, formed at the juncture of the two bores of the ring and at right angles to the bores.

The parts are assembled as shown in Fig. 2.

Having thus described my invention, what I claim, and desire to secure by Letters Patent, is—

1. The combination of the sleeve and the collar, one of said parts having an enlarged cylindrical bore provided with an annular groove in its wall, and a pair of tapering bores one of which has greater taper than the other, and has its largest diameter disposed toward and less than the diameter of the cylindrical bore to provide a shoulder between them and its smallest diameter merging into the largest diameter of the other tapering bore; and a packing fitting these bores surrounding the other part and having a bore to fit a pipe.

2. The combination of the sleeve and the collar, one of said parts having a tapering bore, and a packing-ring having a tapering portion to fit the tapering bore, and a large, and a small bore forming a shoulder at their juncture at right angles thereto, the small bore being adapted to fit the pipe and the large bore receiving a portion of the other of said parts.

3. A packing-ring having an enlarged peripheral portion, a tapering peripheral portion, a shoulder at the junction of the two peripheral portions, an enlarged bore, a bore to fit a pipe, and a shoulder at the junction of the two bores.

4. A packing-ring having a large and a small bore, a shoulder at the junction of the bores, a cylindrical peripheral portion provided with an annular projection, a tapering portion extending from the cylindrical portion, a shoulder at junction of the cylindrical portion and the tapering portion and a second tapering portion extending from the first-mentioned tapering portion and being of less taper and diameter than the latter.

5. A packing-ring having an enlarged peripheral portion, a tapering peripheral portion extending from the enlarged portion, a shoulder at the juncture of the enlarged portion and the tapering portion, a small bore within the tapering portion, and a larger bore within the enlarged portion, said larger bore having a diameter less than the diameter of the greatest diameter of the tapering peripheral portion, whereby a part within the larger bore acts directly upon said tapering portion and not upon the shoulder separating the said tapering portion from the enlarged peripheral portion.

The foregoing specification signed at Bradford, Pennsylvania, this 19th day of September, 1905.

AUSTIN T. HERRICK.

In presence of—
C. C. MELVIN, 2d,
W. H. FENNELL.